United States Patent [19]

Hurst

[11] Patent Number: 4,744,844
[45] Date of Patent: May 17, 1988

[54] METHOD OF MAKING A LAMINATED WINDSHIELD

[75] Inventor: Garfield W. Hurst, Niagara on the Lake, Canada

[73] Assignee: Ford Motor Company, Dearborn, Mich.

[21] Appl. No.: 2,485

[22] Filed: Jan. 12, 1987

[51] Int. Cl.$^4$ ............................................. B32B 17/00
[52] U.S. Cl. ........................................ 156/101; 65/24; 65/26; 156/102; 156/106; 156/152; 219/203; 219/345
[58] Field of Search ..................... 156/99, 102, 106; 219/203, 345; 65/24, 26

[56] References Cited

U.S. PATENT DOCUMENTS

| | | | |
|---|---|---|---|
| 3,329,490 | 7/1967 | Jendrisak | 65/26 |
| 4,388,522 | 6/1983 | Boaz | 219/522 |
| 4,596,590 | 6/1986 | Boaz | 65/60.51 |
| 4,668,270 | 5/1987 | Ramus | 65/106 |

Primary Examiner—John J. Gallagher
Attorney, Agent, or Firm—William E. Johnson; Clifford L. Sadler

[57] ABSTRACT

A method of making a windshield is disclosed. A first glass template (10) is cut. An opaque material is bonded to a surface of the glass template. A conductive material is bonded to portions of the opaque and portions of the surface of the glass template to form electrically conductive terminals. A slippage inducing material is placed on portions of the opaque area not having electrically conductive terminal material thereon. A second glass template (24) is cut. The first and second glass templates are placed in a glass bending device (26). The glass templates are bent with the electrically conductive terminal areas and slippage inducing material permitting relative movement between the templates during the bending thereof without the production of glass chips. The first and second glass templates are separated and an electrically conductive coating is applied between terminal areas of opposite polarity on the first glass template. The glass templates are reunited with an interposed laminating interlayer and laminated to form a laminated glass windshield.

4 Claims, 1 Drawing Sheet

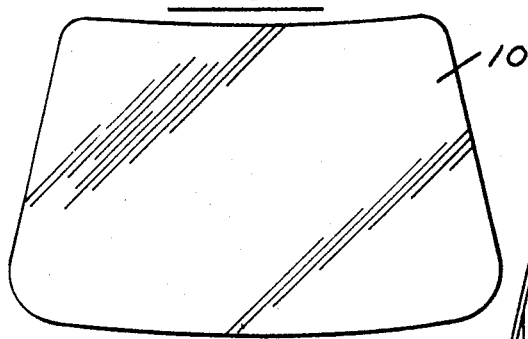
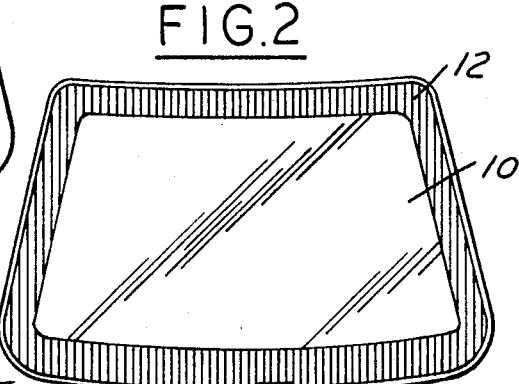
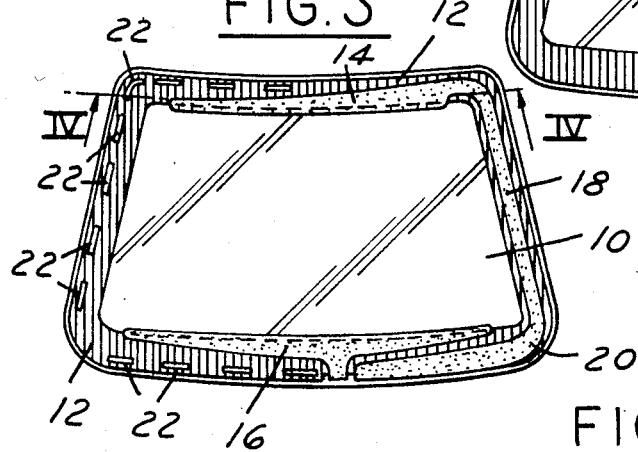
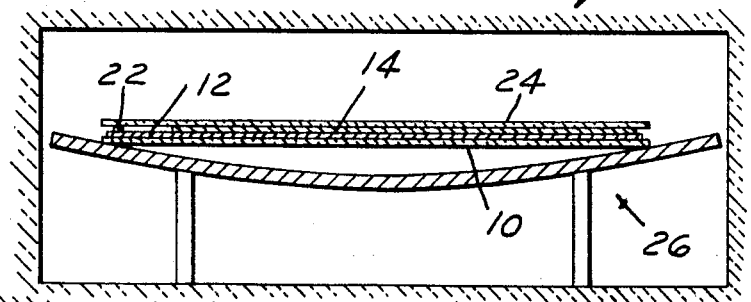
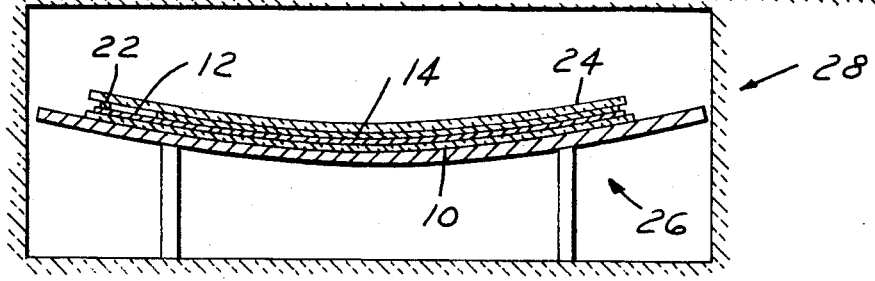

METHOD OF MAKING A LAMINATED WINDSHIELD

TECHNICAL FIELD

This specification is directed to a method of making a windshield. In particular, the specification is directed to a method of making a windshield having two sheets of glass laminated together by a laminating interlayer. The method disclosed is particularly useful in manufacturing windshields known as electrically heated windshields (EHW). An EHW is one in which an electrical current may be applied to a conductive coating contained therein to thereby heat the windshield to defog or defrost the same.

BACKGROUND AND PRIOR ART STATEMENT

Motor vehicles, as presently manufactured, are equipped with systems for defogging and deicing windshields. Generally, the systems depend upon heat generated in the internal combustion engine and transferred to the engine's cooling system to be blown as warm air across the surface of the windshield facing the interior of the vehicle to accomplish the defogging and deicing thereof. In such a case, of course, it is readily apparent that there is a period of time between the starting of an engine and the time that sufficient heat is being generated in its cooling system in order to provide a defogging and/or deicing of the vehicle's windwhield. Depending upon the exact temperature conditions and the time the vehicle has been sitting idle without its engine running, the period of time before sufficient heat is available to accomplish this function can be up to ten minutes or more.

In view of the fact that there can be a rather lengthy delay before the present day motor vehicle's heating and defrosting system can clear a windshield, automotive designers have been attempting to design systems which generate heat from electrical energy to accomplish a relatively rapid defrost and deicing of a vehicle windshield. Such an electrically heated defrosting and deicing system generally would be independent of the normal heating and defrosting system contained in the motor vehicle.

Such electrically heated windshield have become an option on vehicles sold by Ford Motor Company. These electrically heated windshields (EHW) use electrical energy derived from the electrical system of the vehicle to achieve a relatively rapid defrosting and/or deicing of a vehicle windshield. I have been involved in the manufacture of such windshields for Ford Motor Company at Ford's Niagara Falls Glass Plant located in Niagara Falls, Ontario.

As originally developed, the manufacturing of such windshields led to problems when a pair of windshield forming glass templates were bent to proper configuration. As originally developed, the method was one which resulted in minute chips if glass being sometimes generated as a pair of glass templates were bent to a windshield configuration. When such chips were produced during windshield bending, the pair of glass templates had to be scrapped at great economic loss because much time and expense had already gone into the development of the electrically heated windshield by the time the pair of glass templates are subjected to the bending operation. The method that I have developed is one which eliminates the production of such glass chips during the bending of the glass templates to form the bent windshield configuration.

No search was conducted on the subject matter of this specification in the United States Patent and Trademark Office or in any other search facility. I am unaware of any prior art which is relevant to the subject matter of this specification.

DISCLOSURE OF INVENTION

This invention is directed to a method of making a windshield and, more particularly, to a method of making a windshield having two sheets of glass laminated together by a laminating interlayer.

In accordance with the teachings of the method of my invention, the method is initiated by cutting a first glass template from a sheet of glass.

An opaque material is placed on a selected surface of the first glass template. The opaque material is bondable to the selected surface of the glass template to form opaque areas on the selected surface. The opaque areas so formed do not transmit light in the visible wave length area through the glass template. The opaque material is bonded to the selected surface of the first glass template to form the opaque areas.

A conductive material is placed on portions of both the opaque areas and the selected surface of the first glass template. The conductive material is bondable to portions of both the opaque areas and the selected surface. The conductive material forms electrically conductive terminal areas for an electrically conductive coating which is to be applied between terminal areas of opposite polarity in a later step in the method.

A slippage inducing material is placed on portions of the opaque areas not having electrically conductive terminal areas thereon. The slippage inducing material is bondable to portions of the opaque area. The slippage inducing material permits slippage of a glass template thereover.

The conductive material is bonded to the portions of the opaque areas and the selected surface area. The slippage inducing material is also bonded to portions of the opaque areas.

A second glass template is cut from a sheet of glass. This second glass template is placed along with the first glass template in a glass bending device. The two glass templates are placed in the glass bending device in such a manner that the selected surface of the first glass template is in facing relationship with a surface of the second glass template. The first and the second glass templates are bent. The electrically conductive terminal areas and the slippage inducing material permit relative movement between the first and the second glass templates during the bending thereof. Because relative movement is permitted between the two glass templates during the bending thereof, there is no production of glass chips which are otherwise caused if relative movement between the two glass templates is hindered.

The first and the second glass templates are separated. An electrically conductive coating is applied between the terminal areas of opposite polarity on the first glass template. The first and the second glass templates are reunited with an interposed laminating interlayer. The first and the second glass templates are then laminated together to form a laminated glass windshield.

In accordance with still further teachings of the method of my invention, the conductive material forming the terminal areas and the slippage inducting material are the same materials and are placed on the glass in a single operation.

In accordance with further teachings of the method of my invention, the electrically conductive coating between the terminal areas of opposite polarity can be applied to the first glass template prior to the time that the first and second glass templates are bent in a bending operation.

BRIEF DESCRIPTION OF THE DRAWINGS

The novel features that are considered characteristic of the invention are set forth with particularity in the appended claims. The invention itself, however, both as to its organization and method of operation, together with additional objects and advantages thereof, will best be understood from the following description of specific embodiments when read in connection with the accompanying drawings wherein like reference characters indicate like parts throughout the several figures, and in which:

FIG. 1 is a schematic representation of a glass template which has been cut from a sheet of glass;

FIG. 2 is a schematic representation of a glass template having an opaque material placed thereon;

FIG. 3 is a schematic representation of the glass template of FIG. 2 further processed so as to have both a conductive material and a slippage inducing material printed thereon in part on the opaque material and in part on the surface of the glass template;

FIG. 4 is a schematic representation, in cross section taken along line IV—IV of FIG. 3, of two glass templates assembled one over the other prior to a glass bending operation; and FIG. 5 is a schematic representation of the two glass templates of FIG. 4 after the bending operation has been completed.

BEST MODE AND INDUSTRIAL APPLICABILITY

The following description is what I consider to be a preferred embodiment of my method of making a windshield having two sheets of glass laminated together by a laminating interlayer. The following description also sets forth what I now contemplate to be the best mode of carrying out the method of my invention. The description is not intended to be a limitation upon the broader principles of this construction, and while preferred materials are used to illustrate the method of my invention in accordance with the requirements of the laws, it does not mean that other materials can not be used to make this construction.

This specification teaches a method of making a windshield. In particular, this specification teaches a method of making a windshield having two sheets of glass laminated together by a laminating interlayer.

My method is initiated by cutting a glass template 10 from a sheet of glass as is shown in FIG. 1. In accordance with the teachings of the preferred embodiment of the method of my invention, this glass template 10 is the template which will face the outside of the motor vehicle when in an installed position. Generally, this glass template 10 is of larger size than the glass template which will face the interior of the vehicle when the two glass templates are laminated together by a laminating interlayer.

As schematically represented in FIG. 2 an opaque material 12 is placed on a selected surface of the first glass template 10. The selected surface of the first glass template is that surface which will be in contact with the laminating interlayer when the glass template 10 is laminated to another glass template to form a laminated windshield. The opaque material is generally a ceramic enamel which is formed from a suitable organic medium, a glass frit, and a colorant such as manganese, chrome or nickel. The opaque material is bondable to the selected surface of the glass template 10 to form opaque areas on the selected surface which do not transmit light in the visible wave length band.

In the preferred embodiment, the opaque area 12 extends around generally the entire perimeter of the glass template. The purpose of the opaque area is to prevent viewing from the exterior of the vehicle of locations such as under the instrument panel or above the headliner, such areas otherwise being visible because of the location and manner of installing a windshield in a vehicle. Most modern vehicles have opaque areas thereon. These areas may be individually located, for example at the top and bottom of a windshield or at the sides thereof.

The opaque material is bonded to the selected surface of the first glass template. The bonding operation is carried out by driving off the vehicle by heat or by UV actuating radiation in the case of a UV curable vehicle. This bonding of the opaque material to the glass template 10 to form the opaque area 12 is such that the opaque area could not be scratched off of the glass if engaged by a tool or other scratching element. The bond is strong enough that the glass template may be handled and moved from one operation to another without damage to the opaque areas.

The next step of the method of this invention is the placement of conductive material to form an upper terminal 14 and a lower terminal 16. The upper terminal 14 has a portion 18 thereof extending along a side of the glass template 10 and a portion 20 extending along the bottom of the glass template 10 for purposes to be explained hereinbelow. The conductive material which forms the upper terminal 14 and the lower terminal 16 is made from a silver ceramic material as known in the art. The bus bars formed of this material are applied to the surface of the glass template 10 preferably by a silk screen printing operation. Normally, the bus bars are printed and the printing material used is a liquid. The liquid material is then dried, as will be explained below. When dried, the conductive material is bonded to the materials it engages.

Most of the upper terminal 14 is printed on the upper portion of the opaque area 12. A portion of the upper terminal, however, is printed on and is in an engagement with the selected surface of the glass template 10. This portion of the upper terminal printed on the selected surface serves as one of the terminal areas for an electrically conductive coating which is to be applied between the two terminal areas. The portion 18 and portion 20 of the upper terminal 14 that extend along the side and bottom of the glass template 10 are printed in substantially there entirety on the side and bottom portion of the opaque area 12.

The lower terminal 16 has most of its area printed on the lower portion of the opaque area 12. However, here again a portion of the lower terminal 16 is printed directly on the selected surface of the glass template 10 to form the second terminal area for the electrically conductive coating which is to be applied between the two terminal areas. The electrically conductive coating of course is the coating which generates the heat when electrical energy is flowed therethrough which deices and defogs the windshield.

As is also seen in FIG. 3, elongated islands 22—22 of a slippage inducing material is also placed on portions of the opaque area 12. The slippage inducing material is bondable to portions of the opaque areas. The slippage inducing material contained in the elongated islands 22—22 permit slippage of a glass template thereover, as will be explained hereinbelow. In accordance with the teachings of the preferred embodiment of this invention, the elongated islands 22—22 of slippage material are actually elongated islands formed of the same material as is used to form the electrically conductive upper terminal 14 and lower terminal 16. However, one might use other materials for this purpose which could not serve as electrically conductive terminal material. However, for the least costly and most effective way of carrying out the method of my invention, the elongated islands 22 are formed of the same material as the terminals and are placed on the opaque area 12 in the same silk screening operation as is used to place the terminals thereon.

After placement of the conductive material and the slippage inducing material on the opaque area 12 of the glass template 10, these materials are bonded, as by a firing operation, to the contacting surfaces thereof. In the case of the conductive material, it is bonded to the opaque areas it overlies and the area of the selected surface it overlies. In the case of the slippage inducing material, it is bonded to the portions of the opaque area which it overlies in the formation of the elongated islands 22—22. This bonding is a permanent bonding which is sufficient to keep these materials from being removed by scraping or scratching thereof.

Reference is now made to FIG. 4. In order to carry on the method of my invention, a second glass template 24, shown only in end-view in FIGS. 4 and 5, is cut from a sheet of glass. As is shown in FIG. 4, the second glass template 24 and the first glass template 10 are placed in a glass bending device generally identified by the numeral 26. They are placed in this device in such a manner that the selected surface of the first glass template having the opaque area 12, the upper terminal 14, lower terminal 16 and elongated islands 22—22 thereon are in facing relationship with a surface of the second glass template 24.

The glass bending fixture 26 with the first glass template 10 and second glass template 24 thereon are placed in a glass bending chamber generally identified by the numeral 28. As is well known in the art, this bending chamber is an elongated chamber through which the glass bending device is moved slowly. As the bending device moves through the chamber, the glass templates are heated to an appropriate temperature which causes them to bend or sag into contact with a shaping surface of the glass bending device. Thereby the glass sheets are bent to the proper shape for forming a laminated windshield. This condition is shown in FIG. 5.

During the bending of the first and second glass templates 10 and 24, respectively, the electrically conductive terminals 14 and 16, as well as the elongated islands 22—22 of slippage inducing material, permits relative movement between the first and the second glass templates. By permitting an easy relative movement between the two templates during the bending thereof, there is not any production of glass chips. I had found that by bending two glass brackets having thereon all of the materials as described above, except the elongated islands 22—22 of slippage inducing material, in many cases there was not easy movement between the two glass templates and as a result thereof, small glass chips were formed when the glass surfaces were forced under some forced load to move with respect to one another. Of course, when glass chips were formed, the glass templates with the materials applied thereto at a significant cost had to be scrapped. Such scrappage greatly increased the production costs of the good units.

Continuing with the method of my invention, after the first and second glass templates have been bent, as is shown in FIG. 5, they are cooled down and separated from one another. During the bending operation, the opaque area 12, the upper terminal 14, the lower terminal 16 and the elongated islands 22—22 are fire bonded into the glass surface to become a permanent part thereof. Thus, when the glass templates are separated, these elements all stay with the glass template 10.

As is well known in the art, an electrically conductive coating is applied between the upper terminal 14 and the lower terminal 16. Preferably, the electrically conductive coating is placed thereon in a magnetron sputtering operation. Magnetron sputtering of glass surfaces is well known in the art. In accordance with the teachings of a preferred embodiment of this invention, the materials used as target materials in the magnetron sputtering device are zinc and silver. The resulting coating applied to the windshield is a multi layer coating consisting of zinc oxide, a layer of silver and a layer of zinc oxide, together forming the electrically conductive coating. By electrically conductive, I mean that electric current, either AC or DC, can be passed across the silver containing coating between terminals of opposed polarity.

In accordance with an alternate embodiment of the method of my invention, the electrically conductive coating between the upper terminal 14 and the lower terminal 16 on the glass template 10 may be carried out before the glass bending operation.

After the coating operation for the electrically conductive coating, the glass template 10 is reunited with the bent glass template 24 with an interposed laminating interlayer therebetween. The normal laminating interlayer used is polyvinylbuturyl, which is well known in the art. Thereafter, the glass templates are laminated in a standard well-known laminating operation to form a laminated glass windshield.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

I claim:

1. A method of making a windshield having two sheets of glass laminated together by a laminating interlayer which comprises the steps of:
   cutting a first glass template from a sheet of glass;
   placing on a selected surface of said first glass template opaque material which is bondable to said selected surface to form opaque areas on said selected surface which do not transmit light in the visible wave length area;
   bonding said opaque material to said selected surface of said first glass template to form said opaque areas;

placing on portions of both said opaque areas and said selected surface of said first glass template conductive material which is bondable to portions of both said opaque areas and said selected surface to form electrically conductive terminal areas for an electrically conductive coating to be applied between terminal areas of opposite polarity;

placing on portions of said opaque areas not having electrically conductive terminal areas thereon a slippage inducing material which is bondable to portions of said opaque areas to permit slippage of a glass template thereover;

bonding said conductive material to said portions of said opaque areas and said selected surface area;

bonding said slippage inducing material to portions of said opaque areas;

cutting a second glass template from a sheet of glass;

placing said second glass template and said first glass template in a glass bending device in such a manner that said selected surface of said first glass template is in facing relationship with a surface of said second glass template;

bending said first and said second glass templates, said electrically conductive terminal areas and slippage inducing material permitting relative movement between said first and said second glass templates during said bending thereof without the production of glass chips;

separating said first and said second glass templates;

applying an electrically conductive coating between said terminal areas of opposite polarity on said first glass template;

reuniting said first and said second glass templates with an interposed laminating interlayer; and laminating said first and said second glass templates together to form a laminated glass windshield.

2. The method of claim 1 in which said slippage inducing material is the same as said conductive material and is applied in the same step as said conductive material is applied.

3. A method of making a windshield having two sheets of glass laminated together by a laminating interlayer which comprises the steps of:

cutting a first glass template from a sheet of glass;

placing on a selected surface of said first glass template opaque material which is bondable to said selected surface to form opaque areas on said selected surface which do not transmit light in the visible wave length area;

bonding said opaque material to said selected surface of said first glass template to form said opaque area;

placing on portions of both said opaque areas and said selected surface of said first glass template conductive material which is bondable to portions of both said opaque areas and said selected surface to form electrically conductive terminal areas for an electrically conductive coating to be applied between terminal areas of opposite polarity;

placing on portions of said opaque areas not having electrically conductive terminal areas thereon a slippage inducing material which is bondable to portions of said opaque areas to permit slippage of a glass template thereover;

bonding said conductive material to said portions of said opaque areas and said selected surface area;

bonding said slippage inducing material to portions of said opaque area;

applying an electrically conductive coating between said terminal areas of opposite polarity on said first glass template;

cutting a second glass template from a sheet of glass;

placing said second glass template and said first glass template in a glass bending device in such a manner that said selected surface of said first glass template is in facing relationship with a surface of said second glass template;

bending said first and said second glass templates, said electrically conductive terminal areas and slippage inducing material permitting relative movement between said first and second glass templates during said bending thereof without the production of glass chips;

separating said first and said second glass templates;

reuniting said first and said second glass templates with an interposed laminating interlayer; and laminating said first and second glass templates together to form a laminated glass windshield.

4. The method of claim 3 in which said slippage inducing material is the same as said conductive material and is applied in the same step as said conductive material is applied.

* * * * *